US010878203B2

(12) United States Patent
Hayashi et al.

(10) Patent No.: US 10,878,203 B2
(45) Date of Patent: Dec. 29, 2020

(54) TRANSLATION SYSTEM

(71) Applicant: Wovn Technologies, Inc., Tokyo (JP)

(72) Inventors: Takaharu Hayashi, Tokyo (JP); Jeffrey Thomas Sandford, Tokyo (JP)

(73) Assignee: Wovn Technologies, Inc., Tokyo (JP)

( * ) Notice: Subject to any disclaimer, the term of this patent is extended or adjusted under 35 U.S.C. 154(b) by 124 days.

(21) Appl. No.: 16/152,376

(22) Filed: Oct. 4, 2018

(65) Prior Publication Data

US 2019/0065485 A1    Feb. 28, 2019

Related U.S. Application Data

(63) Continuation of application No. PCT/JP2016/061028, filed on Apr. 4, 2016.

(51) Int. Cl.
*G06F 40/58* (2020.01)
*G06F 13/00* (2006.01)

(52) U.S. Cl.
CPC .............. *G06F 40/58* (2020.01); *G06F 13/00* (2013.01)

(58) Field of Classification Search
CPC ....................................................... G06F 40/58
USPC ............................................................ 704/3
See application file for complete search history.

(56) References Cited

U.S. PATENT DOCUMENTS

2006/0100849 A1* 5/2006 Chan ..................... G06F 40/169
704/8
2009/0182547 A1* 7/2009 Niu ......................... G06F 40/45
704/2
2009/0204386 A1* 8/2009 Seligman .............. G06F 40/268
704/2
2010/0138211 A1* 6/2010 Shi ........................... G06F 40/49
704/3
2010/0324887 A1* 12/2010 Dong ..................... G06F 40/58
704/8

(Continued)

FOREIGN PATENT DOCUMENTS

JP    2002091963 A    3/2002
JP    2003141018 A    5/2003

(Continued)

OTHER PUBLICATIONS

PCT International Search Report issued in International Application No. PCT/JP2016/061028, dated Jun. 7, 2016 (4 pages).

*Primary Examiner* — Bhavesh M Mehta
*Assistant Examiner* — Timothy Nguyen
(74) *Attorney, Agent, or Firm* — Finnegan, Henderson, Farabow, Garrett & Dunner, LLP

(57) ABSTRACT

The present disclosure provides a translation system enabling a translation of a web page by an alteration of a website. The translation system comprises: a translation request receiving unit for receiving a translation request from a client device, the translation request including the URL of a web page in which text in a first language is displayed; a translating unit for translating the text in the first language included in the web page indicated by the URL into text in a second language by referring to a bilingual database storing words and phrases in the first language associated with words and phrases in the second language constituting translated words and phrases of the words and phrases in the first language; and a translation sending unit for sending the translated text in the second language to the client device.

6 Claims, 14 Drawing Sheets

(56) References Cited

U.S. PATENT DOCUMENTS

| | | |
|---|---|---|
| 2011/0313755 A1 | 12/2011 | Oh |
| 2012/0150528 A1* | 6/2012 | Upadhyaya ............ G06F 9/4843 704/2 |
| 2012/0316862 A1* | 12/2012 | Sultan ..................... G06F 40/44 704/4 |
| 2013/0073387 A1* | 3/2013 | Heath .................... G06Q 50/01 705/14.53 |

FOREIGN PATENT DOCUMENTS

| | | |
|---|---|---|
| JP | 2003296327 A | 10/2003 |
| JP | 2009181539 A | 8/2009 |
| JP | 2013190975 A | 9/2013 |
| JP | 2015005011 A | 1/2015 |
| WO | WO 01/57722 A1 | 8/2001 |
| WO | WO 2012/115507 A1 | 8/2012 |
| WO | WO2017/175275 A1 | 10/2017 |

* cited by examiner

Bilingual Database

| Translation Source Language Code | Translation Source Word | Translation Target Language Code | Translation Target Word | URL |
|---|---|---|---|---|
| ja | kon'nichiwa | en | hello | http://website.com |
| ja | kōnyū suru | en | buy | http://website.com |
| ⋮ | ⋮ | ⋮ | ⋮ | ⋮ |

FIG. 5

Library Method

Synonym Database

| Translation Source Word | Translation Destination Word | Synonym |
|---|---|---|
| kōnyū | en | buy, purchase |
| roguin | en | login, sign in |
| ⋮ | ⋮ | ⋮ |

FIG. 12

Score Database

| Word | View Count | No. of Clicks | Duration | Exit Rate |
|---|---|---|---|---|
| buy | 100 | 20 | 15 | 30 |
| purchase | 70 | 3 | 20 | 60 |
| ⋮ | ⋮ | ⋮ | ⋮ | ⋮ |

FIG. 13

TRANSLATION SYSTEM

CROSS REFERENCE TO RELATED APPLICATION

The disclosure claims the benefits of priority to PCT Application Number PCT/JP2016/061028, filed on Apr. 4, 2016, which is incorporated herein by reference in its entirety.

TECHNICAL FIELD

The present disclosure relates to a translation system.

BACKGROUND

Websites published on the internet can be accessed by computers anywhere in the world. However, the web pages constituting a website operated in a foreign country are often created in a language other than the native language of that country. These web pages are translated in order to provide easy access to the website.

However, in these types of configurations a separate translating system has to be provided for each website to be translated, and it is sometimes difficult to apply this system to small-scale websites due to cost factors.

SUMMARY

It is an object of the present disclosure to provide a translation system that is able to translate a web page by a simple alteration of a website.

According to one aspect of the present disclosure, a translation system comprises: a translation request receiving unit for receiving a translation request from a client device, the translation request including a URL of a web page in which text in a first language is displayed; a translating unit for translating the text in the first language included in the web page indicated by the URL into text in a second language by referring to a bilingual database storing words and phrases in the first language associated with words and phrases in the second language constituting translated words and phrases of the words and phrases in the first language; and a translation sending unit for sending the translated text in the second language to the client device.

In the present disclosure, "unit" refers not only to a physical means but also to the implementation of the function of the "unit" using software. The functions of a single "unit" or device may be implemented by two or more physical means or devices, or the functions of two or more "units" and devices may be realized by a single physical means or device.

The present disclosure provides a translation system enabling a translation of a web page by an alteration of a website.

BRIEF DESCRIPTION OF THE DRAWINGS

FIG. 5 is a diagram showing an example of the structure of a bilingual database 220.

FIG. 12 is a diagram showing an example of the structure of a synonym database 1000.

FIG. 13 is a diagram showing an example of the structure of a score database 1010.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
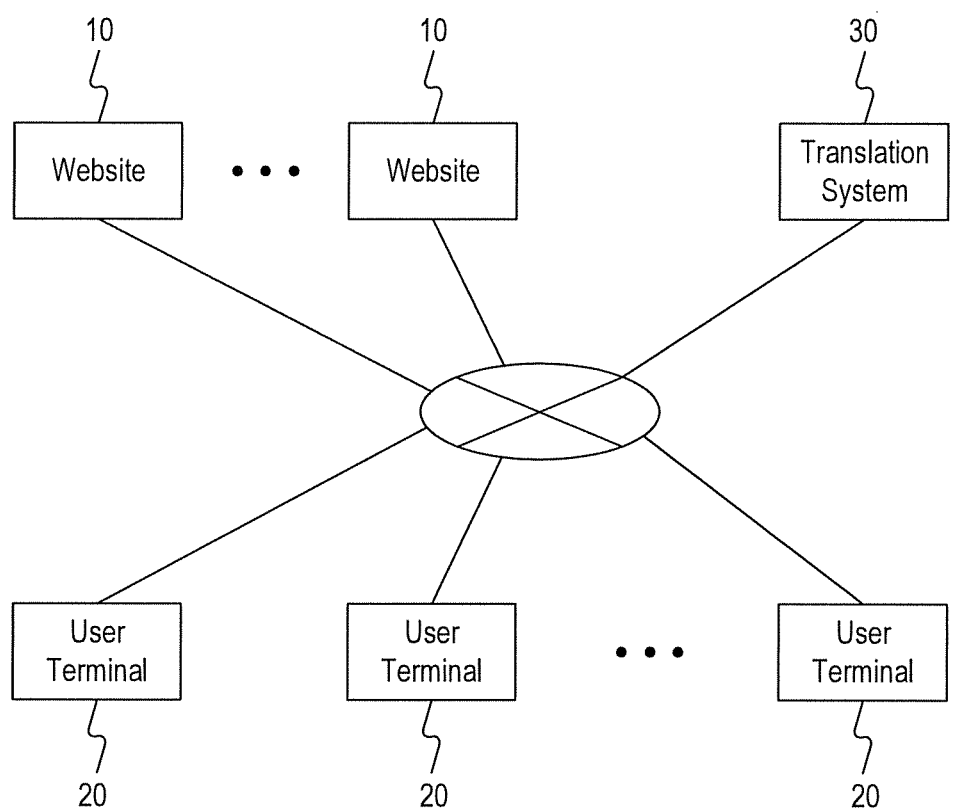
FIG. 1 is a diagram showing a configuration of the information processing system in a first embodiment of the present disclosure.

The following is an explanation of a first embodiment of the present disclosure. FIG. 1 is a diagram showing a configuration of the information processing system in the first embodiment of the present disclosure. As shown in FIG. 1, the information processing system includes websites 10, user terminals 20, and a translation system 30. The websites 10, user terminals 20, and translation system 30 are connected via a network (such as the internet) to enable communication.

The websites 10 provide web pages to the user terminals 20 and are equipped with computers such as web servers, database servers, and application servers. One or more computers may be used for each website 10. The websites 10 can provide web pages to user terminals 20 based on requests from user terminals 20. By using the translation system 30, the websites 10 can provide translated pages to user terminals 20.

A user terminal 20 is a computer used by a user to access a website 10. The user terminal 20 can be, for example, a personal computer, tablet, or smartphone. The user can access a website 10 by operating a browser installed on the user terminal 20.

The translation system 30 provides a web page translation service to websites 10. The translation system 30 includes one or more computers. A translation system 30 is not provided for each website 10 but is shared with the plural websites 10.

The following is an explanation of a translation method for web pages using a translation system 30. In the present embodiment, as examples of the translation method, two types of translation methods are illustrated, namely, the "library method" and the "script method."

Figure 2:
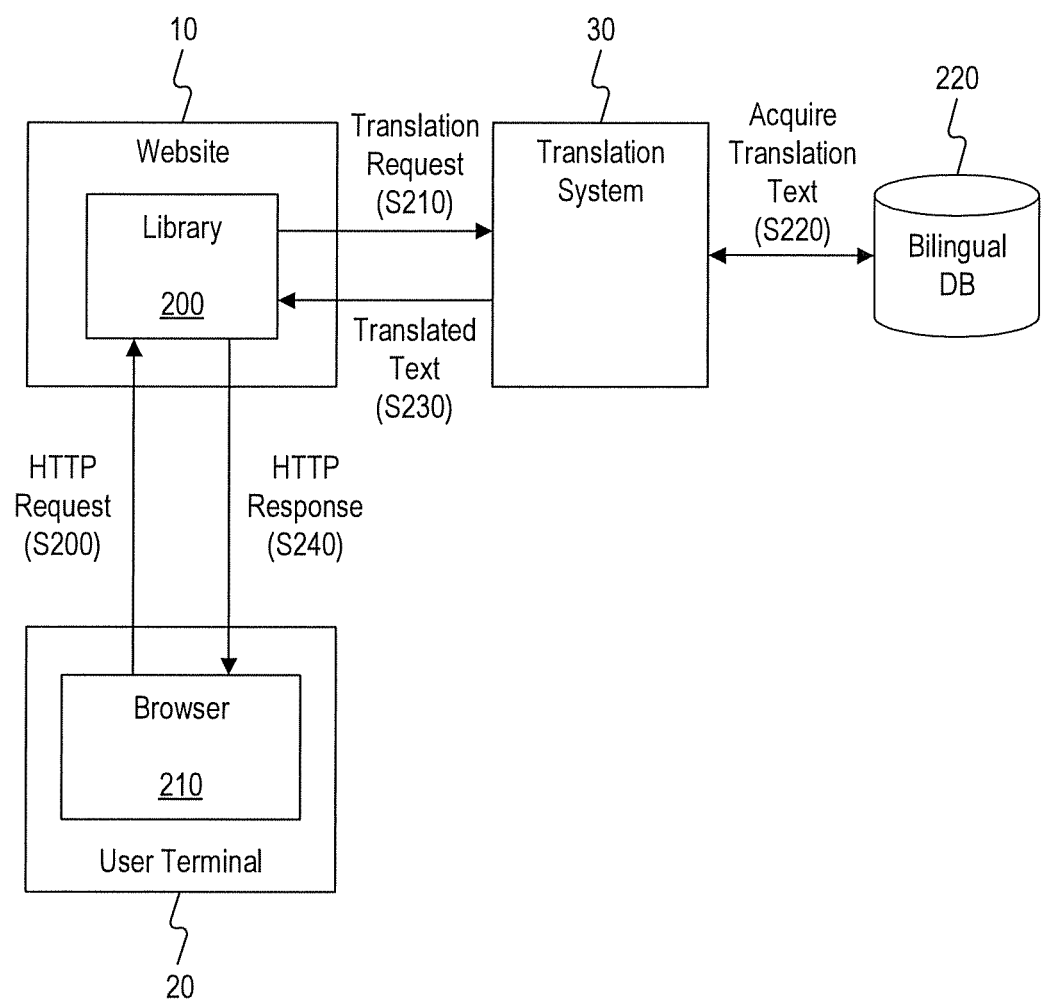
FIG. 2 is a diagram summarizing the library method in the first embodiment.

FIG. 2 is a diagram summarizing the library method in the first embodiment. In the library method, a library 200 for utilizing the translation system 30 is incorporated into a website 10. The user inputs a URL (Universal Resource Locator) indicating a web page of the target website 10 in the browser 210 on the user terminal 20. As a result, an HTTP (Hyper Text Transfer Protocol) request is sent to the website 10 from the user terminal 20 (S200).

When the website 10 receives an HTTP request from a user terminal 20, the website 10 sends a translation request to translate the first language text (for example, Japanese) included in the web pages indicated by the URL into the second language text (for example, English) (S210). The following is an example of the format of this translation request.

url: http://website.com, src: ja, dst: en where "url: http://website.com" is the URL of the web page to be translated, "src: ja" is the translation source language code, and "dst: en" is the translation target language code. In the case that the translation target language is fixed, a translation target language code may be omitted. In the case that the source language can be determined by analysing the web page, a translation source language code may be omitted.

After receiving a translation request from a website 10 (client device), the translation system 30 obtains the first language text to be translated on the web page to be translated based on the URL included in the translation request. For example, the text in the first language to be translated is the text included in the body of the web page (<BODY></BODY>). The translation system 30 acquires translated text translated from the first language text into the second language text by referring to a bilingual database (DB) 220 (S220). The bilingual database 220 stores words and phrases in the first language and words and phrases in the second language, which are translated words and phrases of the words and phrases in the first language, by associating them with each other. Then, the translation system 30 sends the translated text to the website 10 (S230). The following is an example of the format of the translated text sent to the website 10.

src: Kon'nichiwa, dst: Hello, xpath:/body/p/text( )

where "src: Kon'nichiwa" represents the translation source text in the first language, "dst: Hello" represents the translation target text in the second language, and "xpath:/body/p/text( )" represents the code for identifying the location of the text to be translated on the web page.

The website 10 converts the first language text on the web page into the second language text received from the translation system 30 and sends an HTTP response to the user terminal 20 (S240). As a result, a translated web page is displayed in the browser 210 on the user terminal 20.

Figure 3:
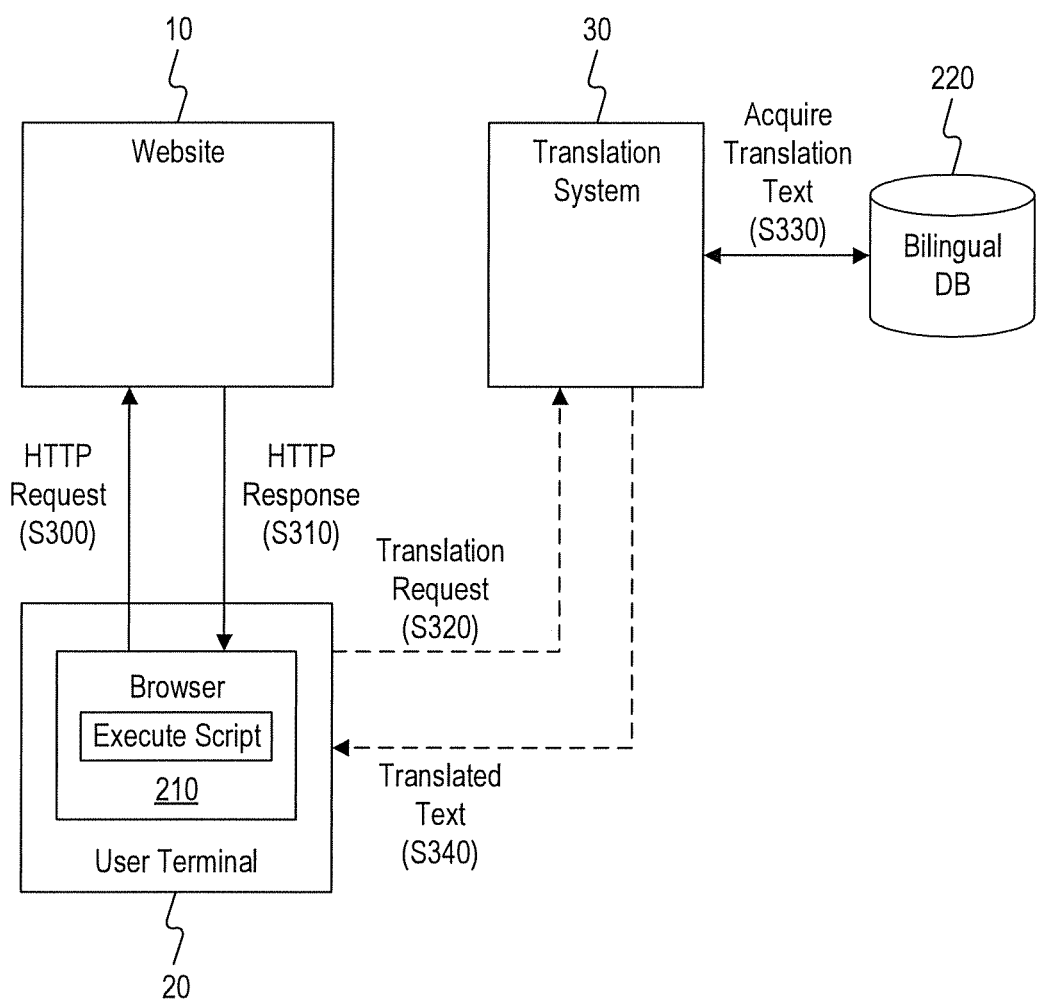
FIG. 3 is a diagram summarizing the script method in the first embodiment.

FIG. 3 is a diagram summarizing the script method in the first embodiment. In the script method, the script for utilizing the translation system 30 is embedded in a web page. The user inputs a URL in the browser 210 on the user terminal 20 indicating a web page of the target website 10. As a result, an HTTP request is sent to the website 10 from the user terminal 20 (S300).

After receiving an HTTP request from a user terminal 20, the website 10 sends an HTTP response to the user terminal 20 for displaying the web page indicated by the URL (S310). As a result, a web page including the translation source text in the first language is displayed in the browser 210 on the user terminal 20. And, the script is embedded in the web page for utilizing the translation system 30. This script is executed by the browser 210 and a translation request is sent from the user terminal 20 to the translation system 30. The format of the translation request is the same as the one in the library method.

Similar to the library method, the translation system 30 acquires translated text translated from the first language text into the second language text by referring to the bilingual database (DB) 220 based on the URL included in the translation request received from the user terminal (client device) (S330). Then, the translation system 30 sends the translated text to the user terminal 20 (S340). The format of the translated text sent to the user terminals 20 is the same as the format of the translated text sent to the websites 10 in the library method.

On the user terminal 20, the first language text on the web page is converted into the second language text received from the translation system 30 by the script executed in the browser 210. As a result, a translated web page is displayed in the browser 210 on the user terminal 20.

The following is an explanation of a configuration using the library method. This configuration can also be implemented using the script method according to some embodiments.

Figure 4:
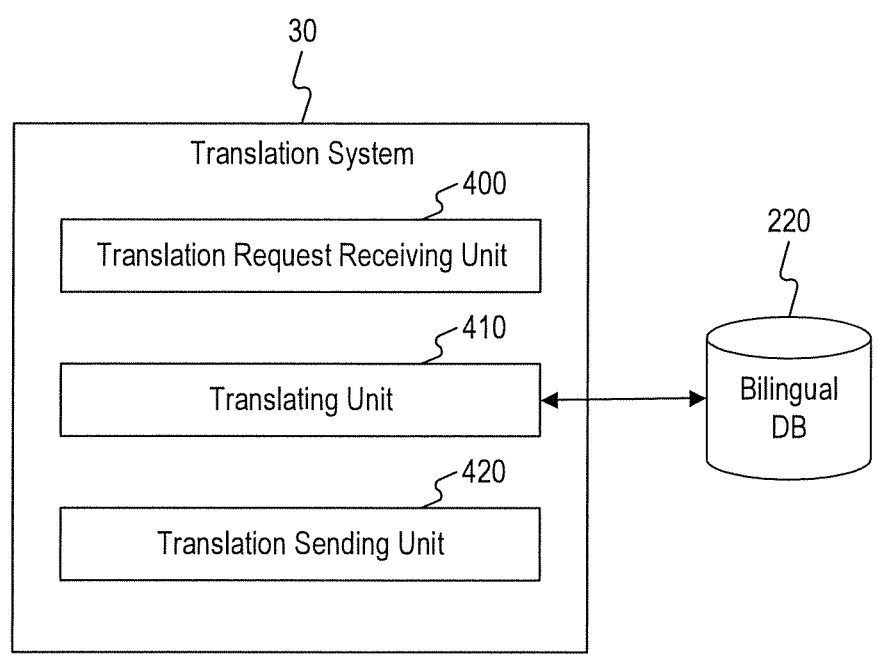
FIG. 4 is a diagram showing an example of a configuration of the translation system 30 in the first embodiment.

FIG. 4 is a diagram showing an example of the configuration of the translation system 30 in the first embodiment. The translation system 30 includes a translation request receiving unit 400, a translating unit 410, and a translation sending unit 420. Each unit can be implemented, for example, by executing a program stored in a memory through a processor in a computer including the memory and the processor.

The translation request receiving unit 400 receives a translation request including the URL of a web page displaying the first language text from a website 10 (client device). As explained above, the translation request contains a language code for the first language, which is the translation source language, and a language code for the second language, which is the translation target language, in addition to the URL.

The translating unit 410 translates the first language text on the web page indicated by the URL included in the translation request into the second language text by referring to the bilingual database 220. FIG. 5 is a diagram showing an example of the structure of a bilingual database 220. In the example shown in FIG. 5, the bilingual database 220 includes translation source language codes, translation source words and phrases, translation target language codes, translation target words and phrases, and URLs. URLs are provided to customize translations for each website. For example, in the example shown in FIG. 5, "kon'nichiwa" is translated to "hello" at http://website.com. In another case, the translation can be registered such that "kon'nichiwa" is translated to "hi" at http://another.com. In other words, the translating unit 410 can obtain a translation according to the URL included in the translation request from the bilingual database 220.

The translation sending unit 420 sends the second language text translated by the translating unit 410 to the website 10 (client device).

Figure 6:
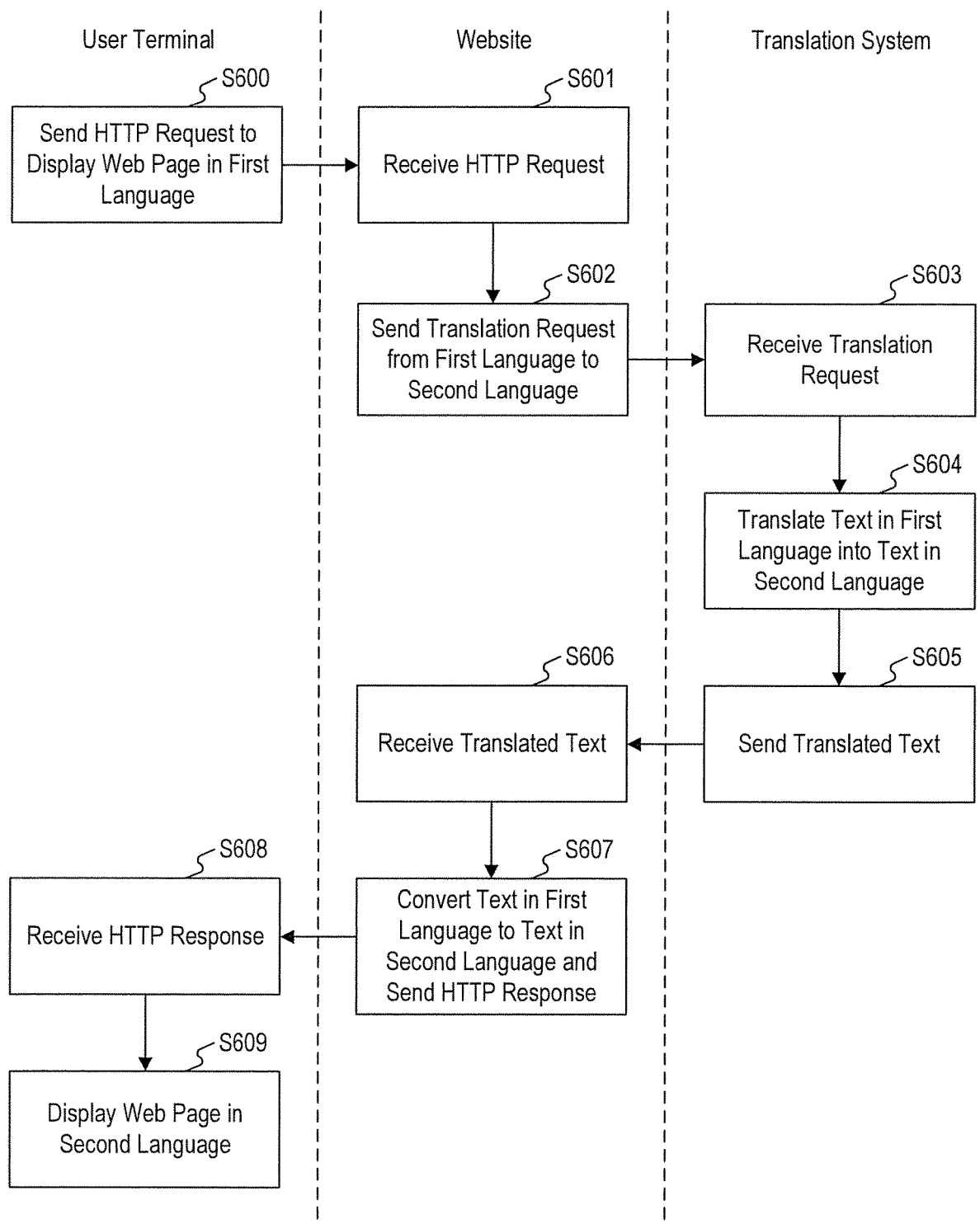
FIG. 6 is a flowchart showing an example of translation processing in the first embodiment.

FIG. 6 is a flowchart showing an example of translation processing in the first embodiment. First, the browser 210 in the user terminal 20 sends an HTTP request for displaying a web page in the first language to the website 10 (S600).

The website 10 receives the HTTP request from the user terminal 20 (S601). Then, the website 10 sends a translation request for translating the first language on the web page into a second language, to the translation system 30 (S602).

The translation request receiving unit 400 in the translation system 30 receives the translation request from the website 10 (S603). Based on this translation request, the translating unit 410 in the translation system 30 translates the first language text on the web page into the second language text (S604). Then, the translation sending unit 420 in the translation system 30 sends the translated text to the website 10 (S605).

The website 10 receives the translated text from the translation system 30 (S606). The website 10 converts the first language text on the web page into the second language text then sends the HTTP response to the user terminal 20 (S607).

The browser 210 in the user terminal 20 receives the HTTP response from the website 10 (S608). As a result, the web page translated into the second language is displayed on the browser 210 (S609).

According to the first embodiment above, it is possible to translate various websites by making the modification, such as incorporating the library or embedding the script.

Also, it is possible to customize translations for each website by providing items specifying the websites in a bilingual database 220.

The following is an explanation of a second embodiment of the present disclosure. The description about common parts with the first embodiment is omitted. The similar elements with those in the first embodiment are marked with reference numerals and the description thereof will be omitted.

Figure 7:
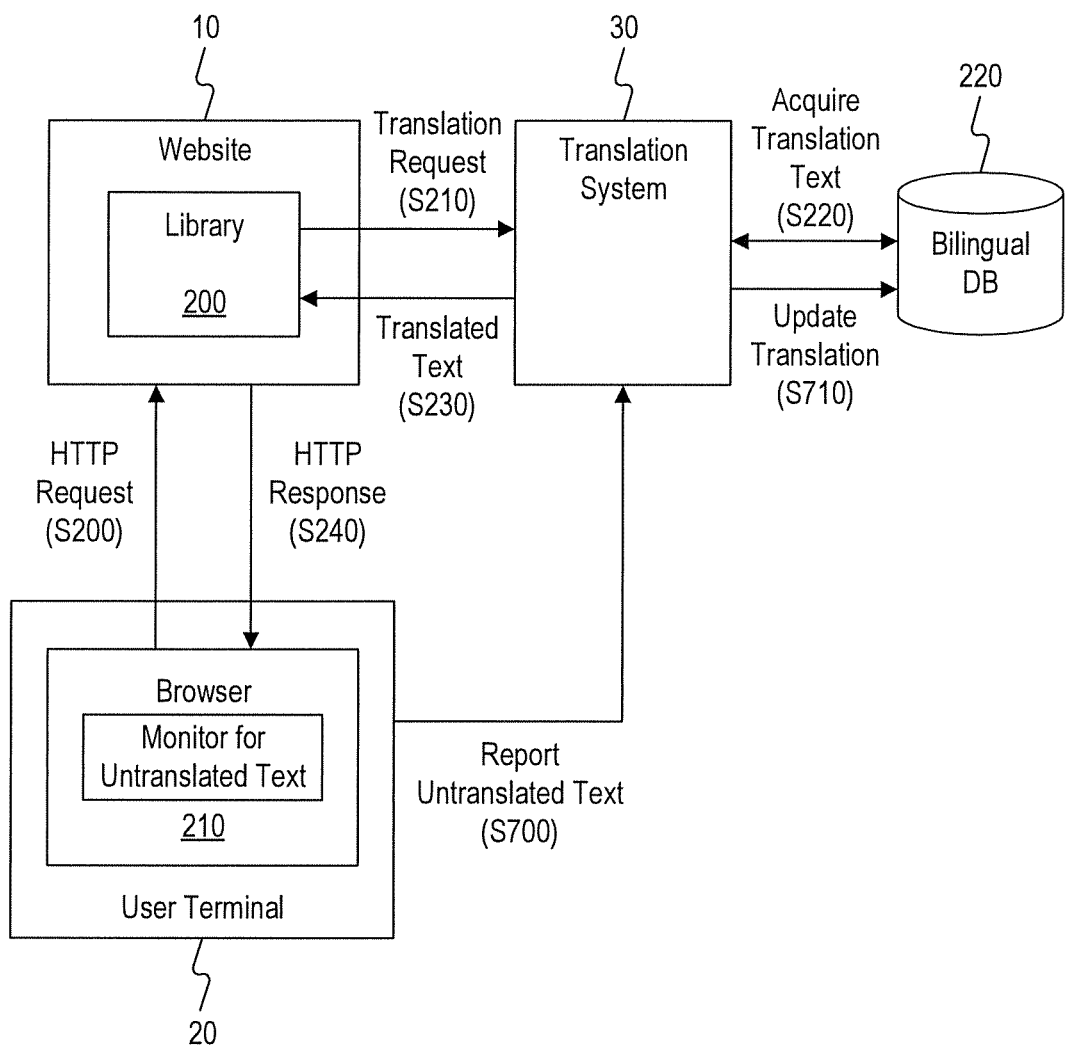
FIG. 7 is a diagram summarizing the library method in a second embodiment of the present disclosure.

FIG. 7 is a diagram summarizing the library method in the second embodiment. The process from the HTTP request (S200) to the HTTP response (S240) is the same as the process in the first embodiment (FIG. 2). In the second embodiment, the script for monitoring untranslated text is embedded in a web page. For example, in a web page whose content is updated dynamically, it is possible that untranslated text exists in the web page displayed on a browser 210. When untranslated text is detected by the script, the untranslated first language text is sent to the translation system 30 (S700). Then, the translation system 30 updates the bilingual database 220 based on this report (S710).

Figure 8:
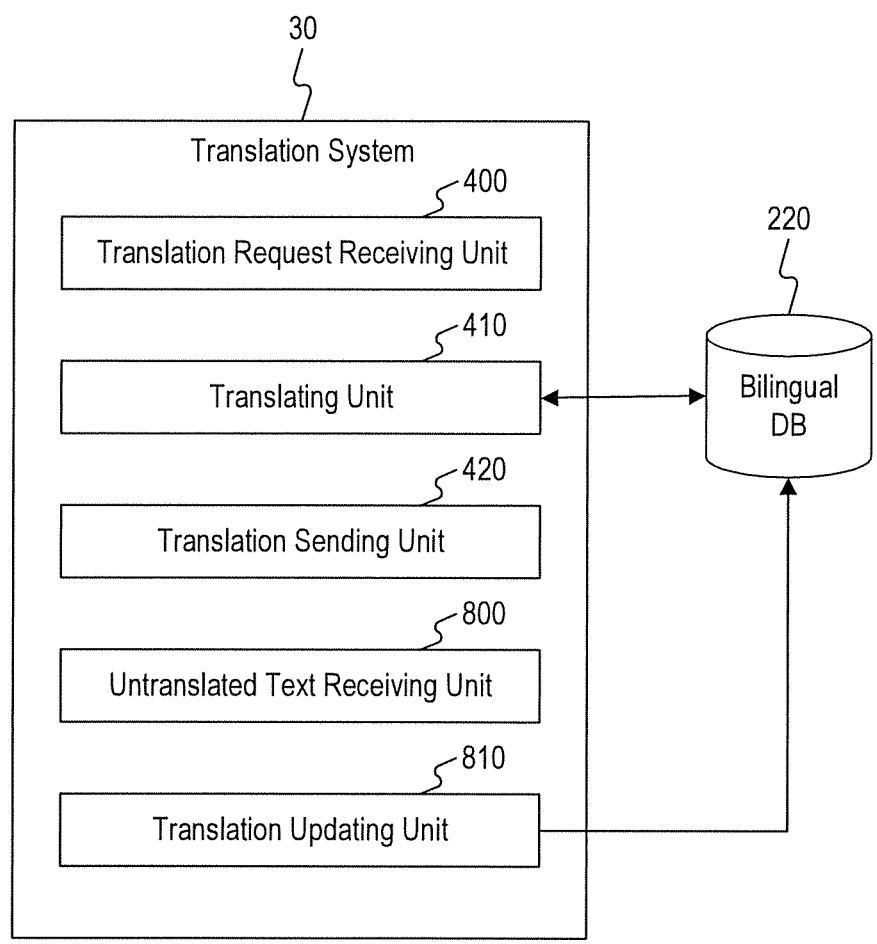
FIG. 8 is a diagram showing an example of a configuration of the translation system 30 in the second embodiment.

FIG. 8 is a diagram showing the configuration of the translation system 30 in the second embodiment. In addition to the configuration shown in FIG. 4, this translation system 30 includes the untranslated text receiving unit 800 and the translation updating unit 810.

The untranslated text receiving unit 800 receives untranslated first language text included in the web page from the user terminal 20 displaying the web page translated into the second language.

The translation updating unit 810 associates first language words or phrases corresponding to the untranslated text with second language words or phrases, which are translated words or phrases of the first language words or phrases, and registers the association in the bilingual database 220.

Figure 9:
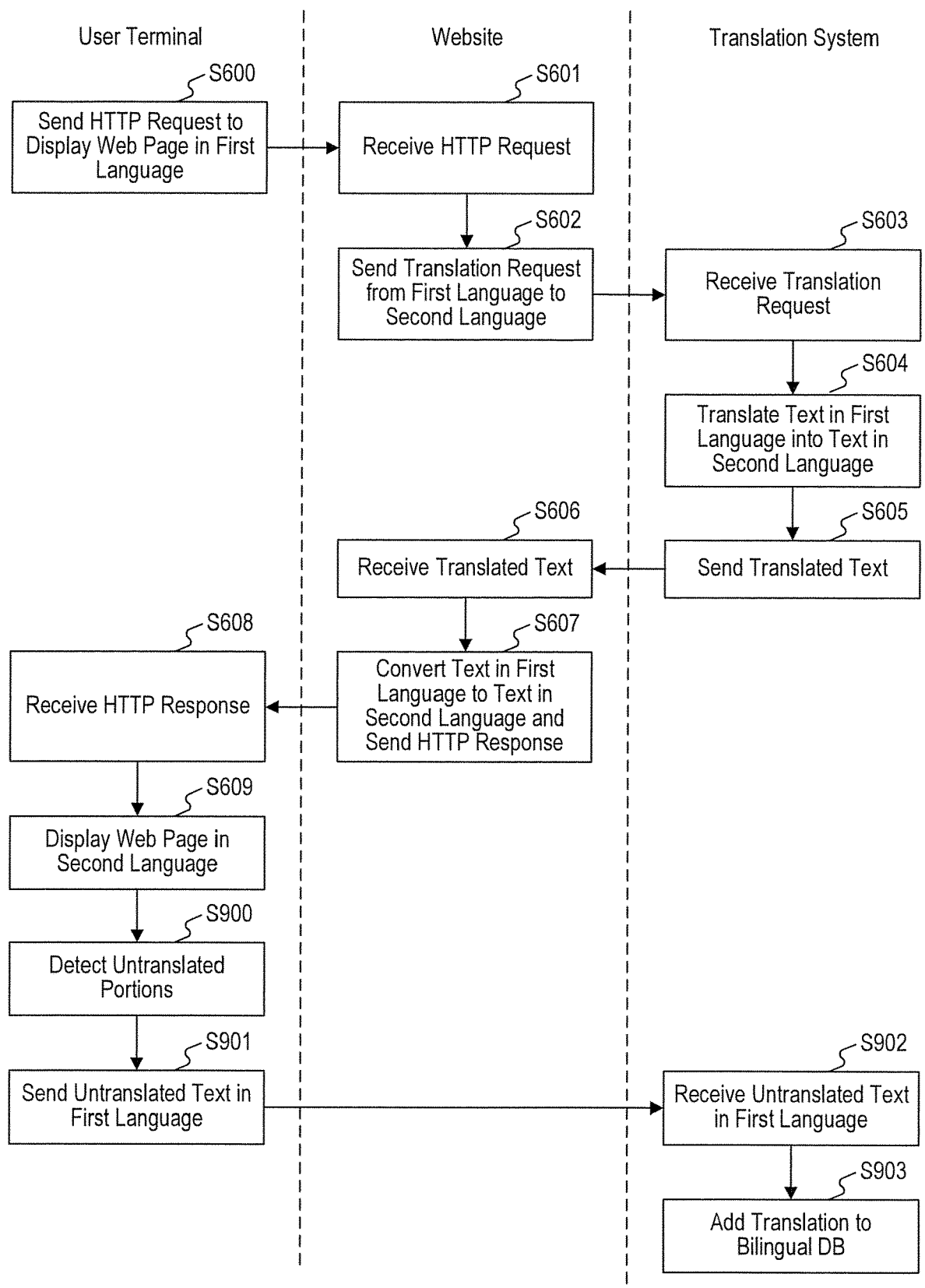
FIG. 9 is a flowchart showing an example of translation processing in the second embodiment.

FIG. 9 is a flowchart showing an example of translation processing in the second embodiment. The process from step S600 to step S609 is the same as the process in the first embodiment (FIG. 6).

In the user terminal 20, the script for searching untranslated text in the web page is executed on the browser. Then, when the untranslated text is detected (S900), the untranslated first language text is sent from the user terminal 20 to the translation system 30 (S901).

The untranslated text receiving unit 800 in the translation system 30 receives the untranslated first language text from the user terminal 20 (S902). The translation updating unit 810 in the translation system 30 registers the translation corresponding to the untranslated text to the bilingual database 220 (S903).

According to the second embodiment above, it is possible to enhance the translation quality by adding a translation of untranslated text to the bilingual database 220.

The following is an explanation of a third embodiment of the present disclosure. The description about common parts with the first embodiment is omitted. The similar elements with those in the first embodiment are indicated with reference numerals and the description thereof will be omitted.

Figure 10:
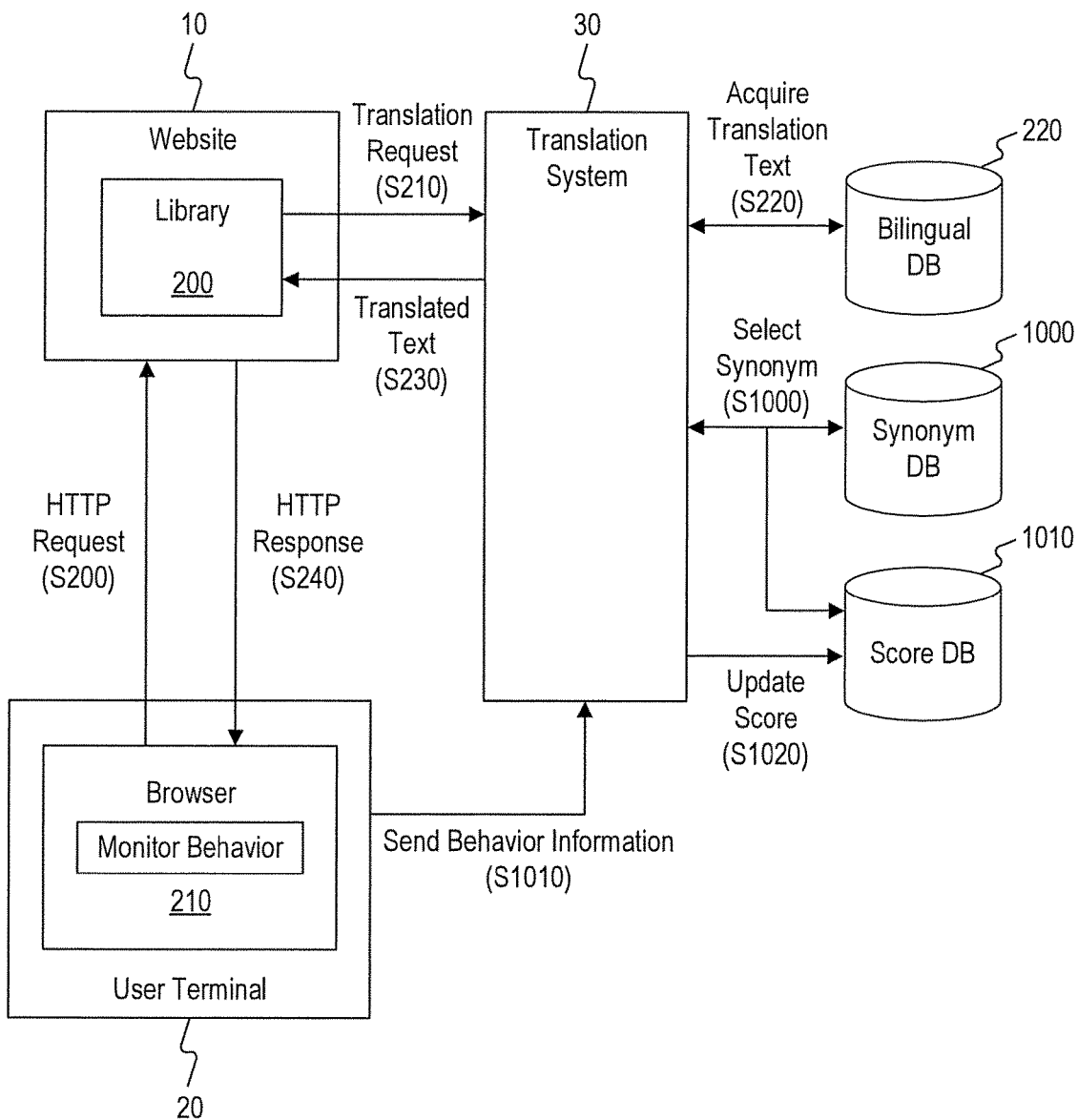
FIG. 10 is a diagram summarizing the library method in a third embodiment.

FIG. 10 is a diagram summarizing the library method in the third embodiment. In the third embodiment, the translation system 30 acquires translated text based on the bilingual database 220 (S220), and selects a synonym from a plurality of second language synonyms (for example, "buy" and "purchase") corresponding to a first language word (for example, "kōnyū") (S1000) by referring to a synonym database (DB) 1000. The synonym can be selected, for example, based on a score stored in a score database (DB) 1010. The translation system 30 sends the translated text including the selected synonym to the website 10 (S230).

In the third embodiment, the script for monitoring the user behavior is embedded in a web page. For example, the user behavior may include clicks on the web page, time spent on the web page, and exit from the web page. The user behavior information detected by the script is sent from the user terminal 20 to the translation system 30 (S1010). The translation system 30 updates the score related to the user behavior based on this behavior information (S1020).

Figure 11:
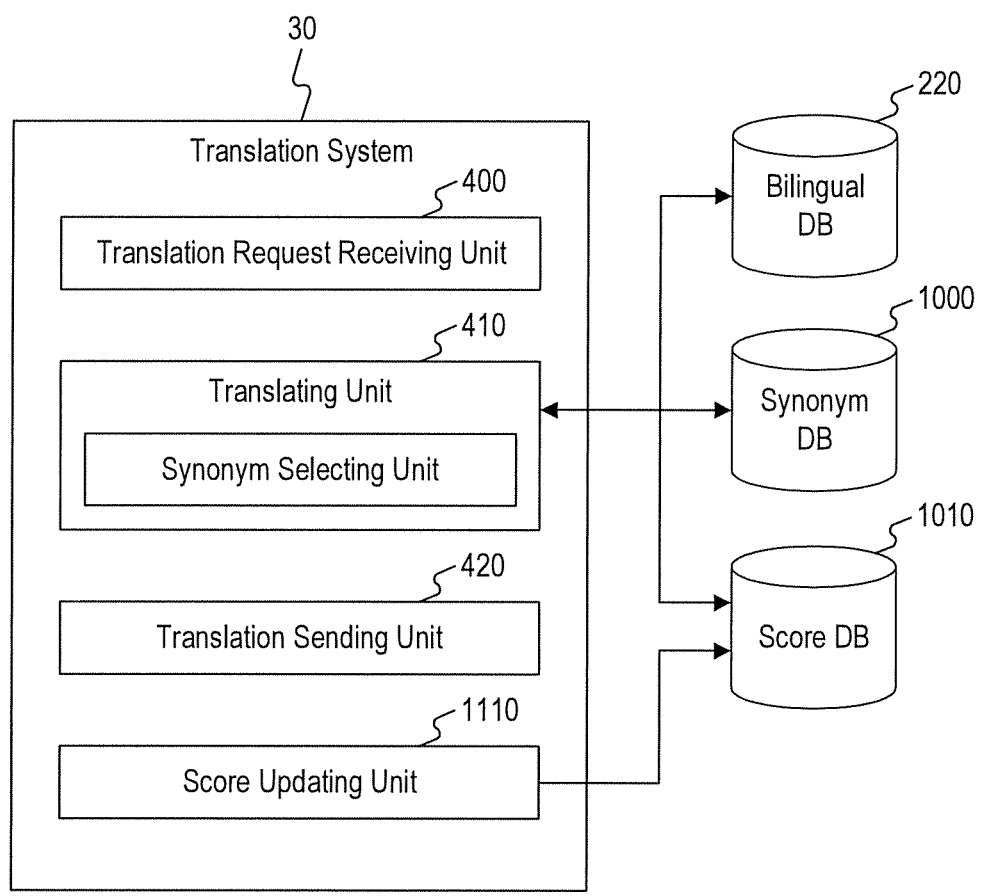
FIG. 11 is a diagram showing an example of a configuration of the translation system 30 in the third embodiment.

FIG. 11 is a diagram showing an example of the configuration of the translation system 30 in the third embodiment. In addition to the configuration shown in FIG. 4, this translation system 30 comprises the synonym selecting unit 1100 and the score updating unit 1110.

The synonym selecting unit 1100 implements a part of functions of the translating unit 410. The synonym selecting unit 1100 refers to the synonym database 1000, and selects a first synonym (for example, "buy") for one translation request (the first translation request) and a second synonym (for example, "purchase") for another translation request (the second translation request) as the translation for a first word included in the first language text (for example, "kōny ū"). The translating unit 410 sends the translated text using the selected synonym to the website 10. FIG. 12 is a diagram showing an example of the structure of a synonym database 1000. In the example shown in FIG. 12, the synonym database 1000 includes translation source words and phrases, translation destination language codes, and synonyms. For example, two synonyms, "buy" and "purchase" are registered as translations for "kōnyū." Further, two synonyms "login" and "sign in" are registered as translations for "roguin." The number of synonyms is not limited to two, and there may be three or more synonyms.

For example, synonyms can be selected by the synonym selecting unit 1100 based on scores stored in a score database 1010. FIG. 13 is a diagram showing an example of the structure of a score database 1010. In the example shown in FIG. 13, the score database 1010 includes words and phrases, view counts, numbers of clicks, duration of stays, and exit rates. "View counts" means the number of times a web page containing a certain word or phrase is displayed. "Number of clicks" means the number of times a click operation is performed on a web page (or the number of times a button displayed on the word or phrase is clicked). "Duration of stay" means the amount of time a user remains on a web page, and "exit rate" means the rate at which a user moves on to another web page or closes the browser without performing a certain operation on the web page (such as clicking a button).

The synonym selecting unit 1100 can determine the score for each word or phrase based on one or more items in the score database 1010. When sending translated text for a web page to a website 10, the synonym selecting unit 1100 tentatively determines a synonym having the highest score as the best translation and selects the synonym at a high rate while using the remaining proportion to measure the effectiveness of each synonym. For example, in the case of "buy," "purchase," and "add to cart" are registered as synonyms for translation of "kōnyū" and the score of "buy" is the highest, "buy" will be selected at a high rate (for example, 95% of the time). In order to measure the effectiveness of each of the three synonyms "buy," "purchase," and "add to cart", each of the synonyms is selected, for example, one-third of the time in the remaining proportion (for example, 5%).

According to some embodiments, the synonym selecting unit 1100 may not need to select a second language synonym for all words and phrases included in the first language text on the web page. For example, the synonym selecting unit 1100 can select second language synonyms for words and phrases displayed in a specific location on the web page (such as on a button) or for specific words and phrases that have an impact on the users behavior (for example, "kōnyū").

The score updating unit 1110 receives user behavior information on a web page from user terminals 20 displaying the web page translated into the second language, and updates the score database 1010 storing the scores for each second language synonym based on the behavior information.

Figure 14:
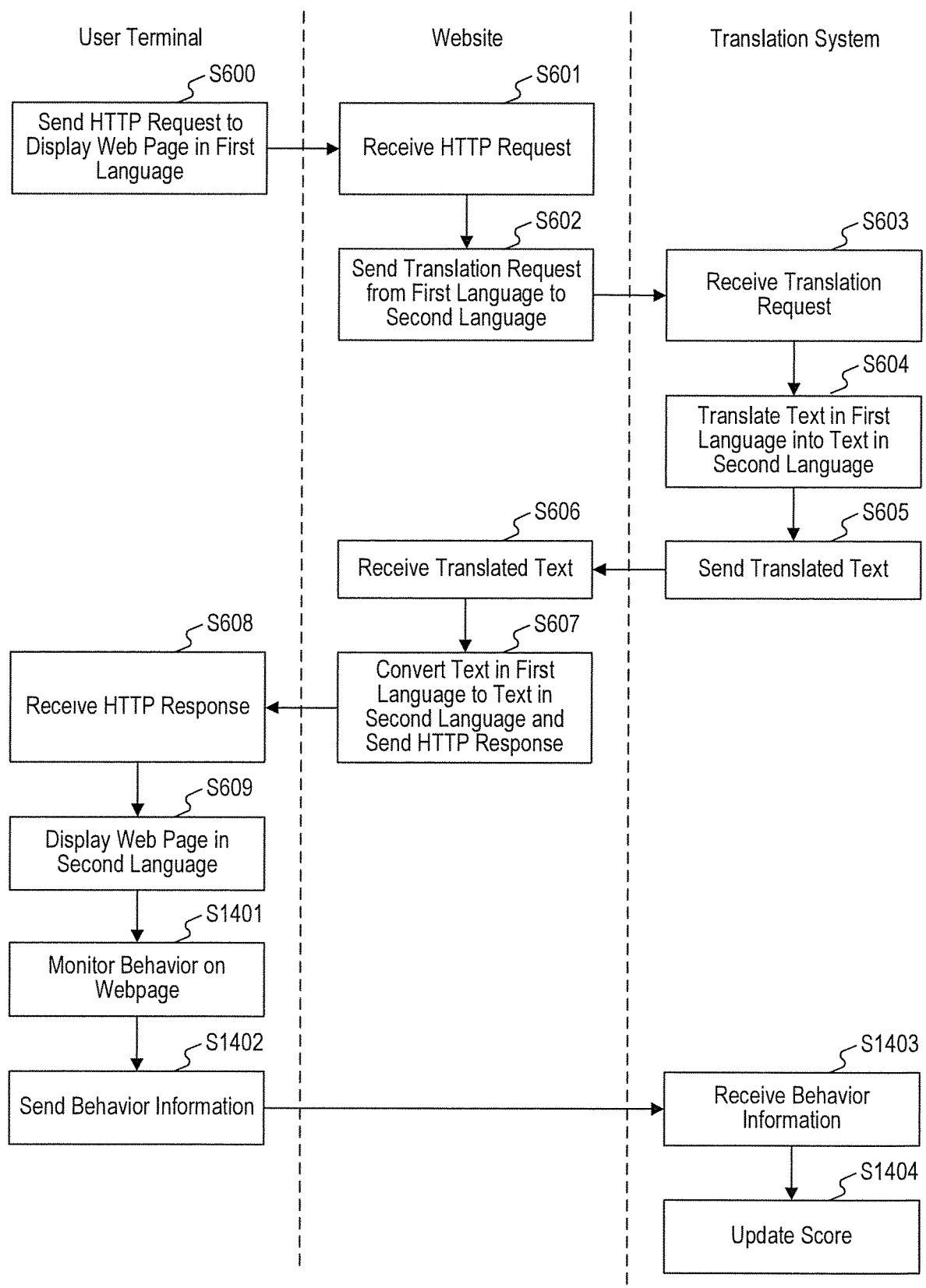
FIG. 14 is a flowchart showing an example of translation processing in the third embodiment.

FIG. 14 is a flowchart showing an example of translation processing in the third embodiment. The description about common parts with the flowchart shown in FIG. 6 is omitted.

The translation request receiving unit 400 in the translation system 30 receives a translation request from a website 10 (S603). The translating unit 410 in the translation system 30 translates the first language text on a web page into the second language text based on the translation request (S604). Then, the synonym selecting unit 1100 selects synonyms for words or phrases that are set to be objects for synonym selection included in the first language text based on the scores stored in the score database 1010 (S1400). The translation sending unit 420 in the translation system 30 sends the translated text including the selected synonyms to the website 10 (S605). The translation sending unit 420 can output information indicating that synonyms were selected by the synonym selecting unit 1100 for effectiveness measurement together with the translated text. This information is included in the HTTP response to the user terminal 20.

In the user terminal 20, the script for monitoring the user behavior is executed in the browser (S1401). Then, user behavior information is sent from the user terminal 20 to the translation system 36 (S1402). According to some embodiments, monitoring of the user behavior by the user terminal 20 may be performed only when a synonym is selected for the effectiveness measurement.

The score updating unit 1110 in the translation system 30 receives user behavior information from the user terminal 20 (S1403). Then, the score updating unit 1110 updates the score stored in the score database 1010 (S1404) based on the user behavior information.

According to the third embodiment above, it is possible to analyse user behavior for each synonym. For example, by analysing the user behavior, it is possible to select a translation that leads a user to make a targeted action (for example, behavior to purchase a product).

The present embodiments are for illustrative purposes about the present disclosure, and are not intended to limit to specific embodiments. The present disclosure can be modified and improved without departing from its purpose, and equivalents thereof are also included in the present disclosure.

The invention claimed is:

1. A computer-readable non-transitory recording medium comprising a translation program for causing a computer to implement:
    a translation request receiving unit for receiving, from a web server or a user terminal, a translation request including a URL (Universal Resource Locater) of a web page displaying text in a first language;
    a translating unit for translating the text in the first language included in the web page indicated by the URL into text in a second language by referring to a bilingual database storing words and phrases in the first language associated with words and phrases in the second language constituting translated words and phrases of the words and phrases in the first language;
    a translation sending unit for sending the translated text in the second language to the web server or the user terminal;
    an untranslated text receiving unit for receiving, from the user terminal, untranslated text in the first language included in the web page translated into the second language, the untranslated text being detected by a program executed on the user terminal; and
    a translation updating unit for associating a word or phrase in the first language corresponding to the untranslated text with a word or phrase in the second language constituting a translation of the word or phrase in the first language and for registering the association in the bilingual database.

2. The computer-readable non-transitory recording medium according to claim 1, wherein
    the translation request includes a language code indicating a translation target language; and
    the translating unit is configured to translate the text in the first language into the text in the second language indicated by the language code.

3. The computer-readable non-transitory recording medium according to claim 1, wherein
    the bilingual database includes URLs as items associating words and phrases in the first language with words and phrases in the second language and
    the translating unit is configured to translate the text in the first language into the text in the second language based on the words and phrases in the first language and the words and phrases in the second language corresponding to the URL included in the translation request.

4. The computer-readable non-transitory recording medium according to claim 1, wherein:
    the translating unit is configured to select a first synonym for a first translation request among translation requests and to select a second synonym for a second translation request among the translation requests as a translation for a first word or phrase included in the text in the first language, by referring to a synonym database storing synonyms of words and phrases in the second language; and the translation program causing the computer to further implement:

a score updating unit for receiving, from a first user terminal on which a first web page including the first synonym is displayed based on the first translation request, first behavior information indicating user behavior on the first web page and for receiving, from a second user terminal on which a second web page including the second synonym is displayed based on the second translation request, second behavior information indicating user behavior on the second web page; and a score updating unit for updating a score database storing a score for each synonym in the second language based on the first behavior information and the second behavior information.

5. The computer-readable non-transitory recording medium according to claim 4, wherein the score for the first synonym is higher than the score for the second synonym; and a rate at which the first synonym is selected is higher than a rate at which the second synonym is selected.

6. A translation method comprising:

receiving a translation request from a web server or a user terminal, the translation request including a URL of a web page in which text in a first language is displayed;

translating the text in the first language included in the web page indicated by the URL into text in a second language by referring to a bilingual database storing words and phrases in the first language associated with words and phrases in the second language constituting translated words and phrases of the words and phrases in the first language;

sending the translated text in the second language to the web server or the user terminal;

receiving, from the user terminal, untranslated text in the first language included in the web page translated into the second language, the untranslated text being detected by a program executed on the user terminal; and associating a word or phrase in the first language corresponding to the untranslated text with a word or phrase in the second language constituting a translation of the word or phrase in the first language and registering the association in the bilingual database.

\* \* \* \* \*

UNITED STATES PATENT AND TRADEMARK OFFICE
CERTIFICATE OF CORRECTION

PATENT NO. : 10,878,203 B2  
APPLICATION NO. : 16/152376  
DATED : December 29, 2020  
INVENTOR(S) : Takaharu Hayashi et al.

Page 1 of 1

It is certified that error appears in the above-identified patent and that said Letters Patent is hereby corrected as shown below:

In the Claims

In Claim 2, Column 8, Line 42, "wherein" should read --wherein:--.

In Claim 3, Column 8, Line 49, "wherein" should read --wherein:--.

In Claim 5, Column 9, Line 19, "wherein" should read --wherein:--.

Signed and Sealed this  
Seventeenth Day of August, 2021

Drew Hirshfeld  
*Performing the Functions and Duties of the*  
*Under Secretary of Commerce for Intellectual Property and*  
*Director of the United States Patent and Trademark Office*